United States Patent [19]
Nitta

[11] Patent Number: 5,255,342
[45] Date of Patent: Oct. 19, 1993

[54] PATTERN RECOGNITION SYSTEM AND METHOD USING NEURAL NETWORK

[75] Inventor: Tsuneo Nitta, Yokohama, Japan

[73] Assignee: Kabushiki Kaisha Toshiba, Kawasaki, Japan

[21] Appl. No.: 993,979

[22] Filed: Dec. 17, 1992

Related U.S. Application Data

[63] Continuation of Ser. No. 447,405, Dec. 7, 1989, abandoned.

[30] Foreign Application Priority Data

Dec. 20, 1988 [JP] Japan .................................. 63-321141

[51] Int. Cl.$^5$ .............................................. G10L 9/04
[52] U.S. Cl. ......................................................... 395/2
[58] Field of Search .................................. 381/41–46; 395/2, 21; 364/807

[56] References Cited

U.S. PATENT DOCUMENTS

| | | | |
|---|---|---|---|
| 4,394,538 | 7/1983 | Warren et al. | 381/43 |
| 4,624,011 | 11/1986 | Watanabe et al. | 381/43 |
| 4,736,429 | 4/1988 | Niyada et al. | 381/43 |
| 4,783,802 | 11/1988 | Takebayashi et al. | 381/43 |
| 4,805,225 | 2/1989 | Clark | 382/15 |
| 4,888,823 | 12/1989 | Nitta et al. | 381/43 |
| 4,903,306 | 2/1990 | Nakamura | 381/42 |
| 4,942,608 | 7/1990 | Shigehara | 381/43 |

OTHER PUBLICATIONS

Specht et al, "Probabalistic Neural Networks for Classification, Mapping, or Associative Memory", IEEE Inter. Conf. on Neural Networks, Jul. 24-27, 1988 pp. 525-532.

Wasserman, "Neural Computing", 1989, Van Nostrand Reinhold Inc., N.Y., pp. 43-59.

Proceedings of the 9th International Conference on Pattern Recognition Rome, Nov. 14-17, 1988, pp. 1225-1229, H. Segawa et al, "A Similarity Value Transformation Method for Probabilistic Scoring".

*Primary Examiner*—Michael R. Fleming
*Assistant Examiner*—Michelle Doerrler
*Attorney, Agent, or Firm*—Oblon, Spivak, McClelland, Maier & Neustadt

[57] ABSTRACT

An inner product computing unit computes inner products of an input pattern whose category is unknown, and orthogonalized dictionary sets of a plurality of reference patterns whose categories are known. A nonlinear converting unit nonlinearly converts the inner products in accordance with a positive-negative symmetrical nonlinear function. A neural network unit or a statistical discriminant function computing unit performs predetermined computations of the nonlinearly converted values on the basis of preset coefficients in units of categories using a neural network or a statistical discriminant function. A determining section compares values calculated in units of categories using the preset coefficients with each other to discriminate a category to which the input pattern belongs.

4 Claims, 6 Drawing Sheets

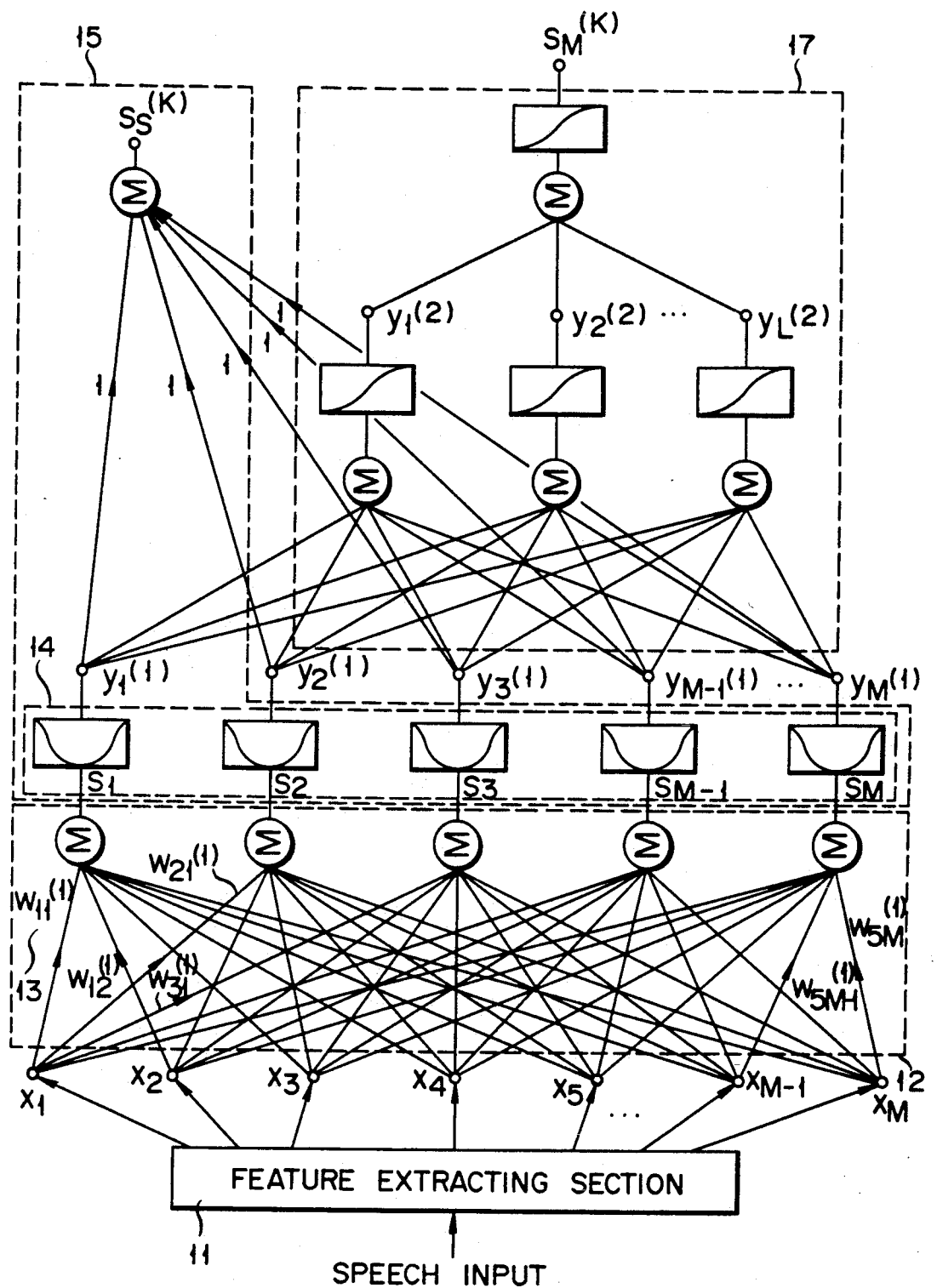
F I G. 6

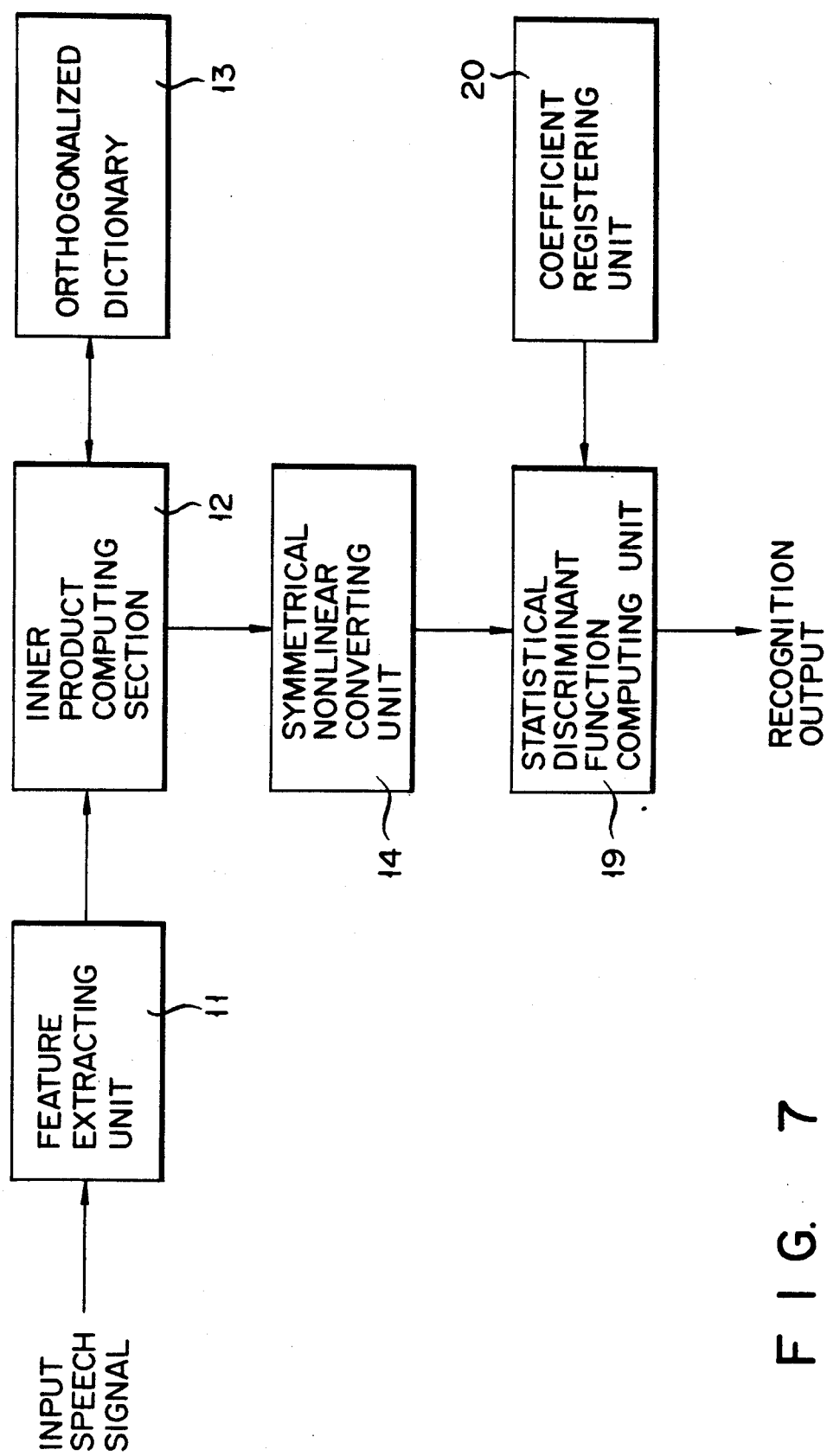
F I G. 7

PATTERN RECOGNITION SYSTEM AND METHOD USING NEURAL NETWORK

This application is a continuation of application Ser. No. 07/447,405, filed on Dec. 7, 1989, now abandoned.

BACKGROUND OF THE INVENTION

1. Field of the Invention

The present invention relates to a pattern recognition system and method, which can accurately recognize an input pattern such as speech, character, figure, and the like and, more particularly, to an improvement in a partial space method.

2. Description of the Related Art

In recent years, studies about pattern recognition processing for speech, character, figure, and the like have been made, and the pattern recognition processing has been receiving a great deal of attention as an important technique for realizing a natural man-machine interface.

A pattern recognition apparatus for executing pattern recognition processing of this type basically has an arrangement shown in FIG. 1. The respective units perform the following processing.

1) A feature extracting unit 1 analyzes an input pattern to obtain its feature pattern.

2) By referring to a reference pattern memory 2 which stores reference patterns obtained in units of categories of patterns to be recognized as dictionaries, similarities or distances between the reference pattern dictionaries and the feature pattern are computed by a pattern matching unit 3.

3) The collation results are determined by a determining unit 4 to obtain a recognition result of the input pattern. Note that the determining unit 4 obtains a category name of the reference pattern which has the highest similarity value (or the smallest distance value) with the input pattern as a recognition result or a recognition candidate for the input pattern. When the input pattern is a speech waveform, the feature extracting unit 1 performs Band Pass Filter (BPF) analysis or Linear Prediction Coding (LPC) analysis of the input speech, and then detects a speech interval, thus obtaining acoustic analysis data in this speech interval as an input pattern.

When the input pattern is a character image, the feature extracting unit 1 quantizes the input character image, and then extracts a character portion, thus obtaining feature data of the character pattern as an input pattern.

As a method in the pattern recognition processing, a subspace method is known. Pattern recognition using the subspace method is described in, e.g., U.S. Pat. No. 4,624,011 (Watanabe et. al.)

In the subspace method, as reference pattern dictionaries of categories, dictionaries ($\phi(K,m)$; K is category name, and m is the number of an orthogonal axis; $m = 1, 2, \ldots, M$) which are orthogonalized in advance by KL expansion in units of categories are created as orthogonalized dictionary sets. Similarities $S(K)$ between the dictionaries and an input pattern (F) are computed according to the following equation to perform pattern matching processing:

$$S_{(K)} = \sum_{m=1}^{M} (F \cdot \phi_{(K,m)})^2 / ||F|| \qquad (1)$$

where (·) indicates an inner product, and $||\ ||$ indicates a norm.

The pattern matching method according to the subspace method is widely used in pattern recognition since it can relatively easily obtain an accurate recognition result.

In the conventional pattern recognition processing using the subspace method, as shown in the abovementioned equation, the inner products of the input pattern (F) and the orthogonal axes ($\phi(K,m)$) of the orthogonalized dictionary sets are merely accumulated, and the overall feature of the input pattern is evaluated using the accumulation value. In other words, the pattern recognition is performed not by using the individual inner products obtained between the input pattern and the orthogonal axes but by using the accumulation value representing the overall feature. For this reason, when an inner product with respect to a given orthogonal axis takes a large value, which cannot be obtained with a correct pattern, due to noise, the accumulation result of the inner products tends to become a value larger than that of the inner products for the correct pattern. When pattern matching processing is performed using the subspace method of this type, a determination error (recognition error) caused by a category other than an object to be recognized and various noise components tends to occur.

In order to solve this problem, recently, pattern matching processing using a multi-layer neural network is receiving a great deal of attention. A nonlinear discriminant function is realized by the neural network, for sequentially transmitting neurons carrying information, to extract feature data of an input pattern. The neural network of this type poses the problem of how to determine a set of coefficients for defining the way of combining outputs from lower-order layers. As an algorithm for obtaining these coefficients, a back propagation (BP) algorithm is known (NATURE Vol. 323 9, pp. 553–536 (1986, Oct) Learning representations by back-propagation errors). Various reports announced that pattern matching processing could be accurately executed upon application of the BP algorithm.

However, when a neural network is used, an enormous amount of computations for determining coefficients of each layer must be performed, and a load of computation processing is very large.

SUMMARY OF THE INVENTION

It is an object of the present invention to provide a pattern recognition system and method which can reduce a load on computation processing by utilizing advantages of a neural network.

In order to achieve the above object, according to a first aspect of the present invention, a pattern recognition system comprises: orthogonalized dictionary means for storing a plurality of reference patterns whose categories are known; inner product computing means for computing inner products of an input pattern whose category is unknown and the plurality of reference patterns which are stored in the orthogonalized dictionary means and whose categories are known; converting means for nonlinearly converting the inner products, which are computed by the inner product computing means, in accordance with a positive-negative symmetrical nonlinear function; evaluation value computing means for computing evaluation values on the basis of the nonlinearly converted values by the converting means and coefficients which are preset in units of categories; comparing means for comparing the evaluation values obtained by the evaluation value computing means in units of categories with each other; and discriminating means for discriminating a category to which the input pattern belongs on the basis of the comparison results of the comparing means.

According to a second aspect of the present invention, a pattern recognition method comprises the steps performed by a computer of: computing inner products of an input pattern whose category is unknown and orthogonalized dictionary sets of a plurality of reference patterns whose categories are known; nonlinearly converting the inner products, which are computed in the computing step, in accordance with a positive-negative symmetrical nonlinear function; computing evaluation values on the basis of the nonlinearly converted values by the converting step and coefficients which are preset in units of categories; comparing the evaluation values obtained by the evaluation value computing step in units of categories with each other; and discriminating a category to which the input pattern belongs on the basis of the comparison results of the comparing step.

BRIEF DESCRIPTION OF THE DRAWINGS

FIG. 6 shows a neural network of the pattern recognition system shown in FIG. 5; and FIG. 7 is a block diagram showing the second embodiment of the present invention.

DETAILED DESCRIPTION OF THE PREFERRED EMBODIMENTS

Figure 1:
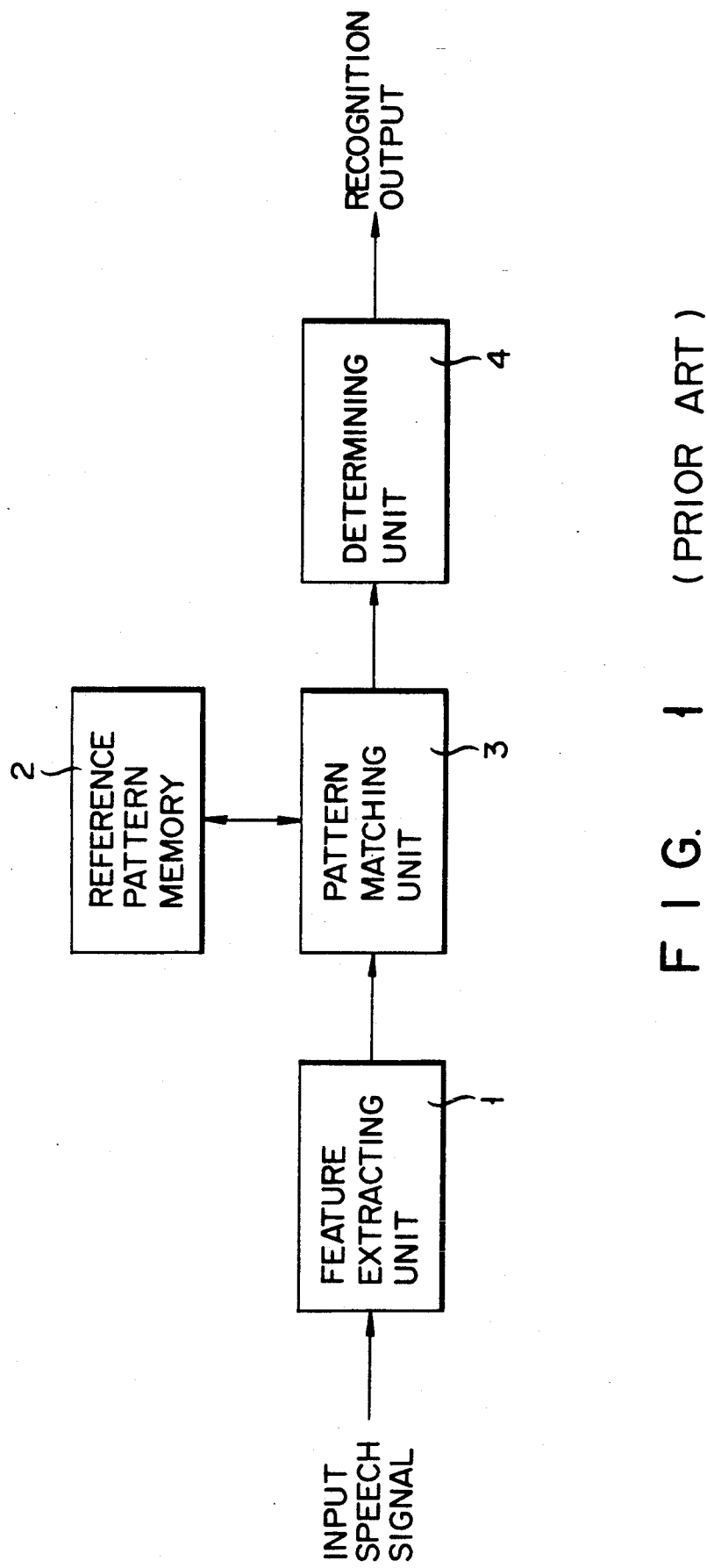
FIG. 1 is a block diagram of a typical pattern recognition apparatus.
Figure 2A:
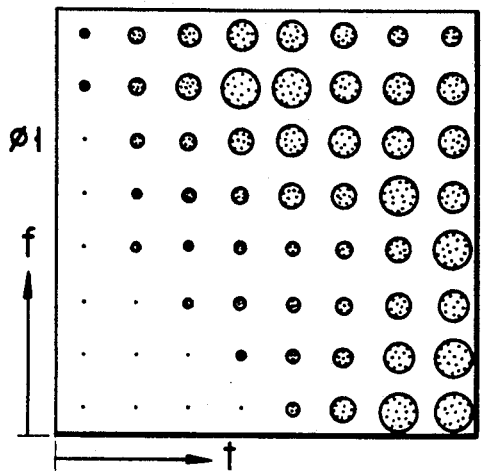
FIGS. 2A through 2D show patterns of orthogonal vectors obtained by a KL expansion.
Figure 2B:
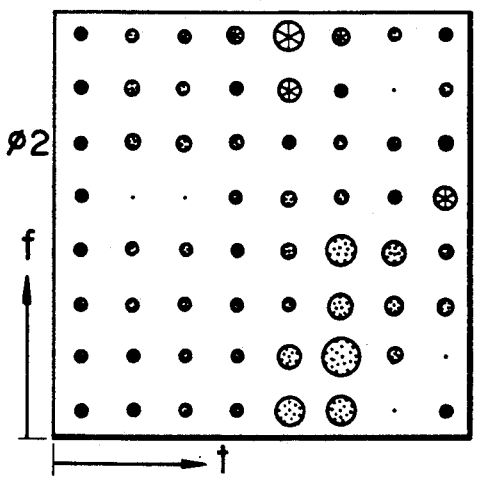
Figure 2C:
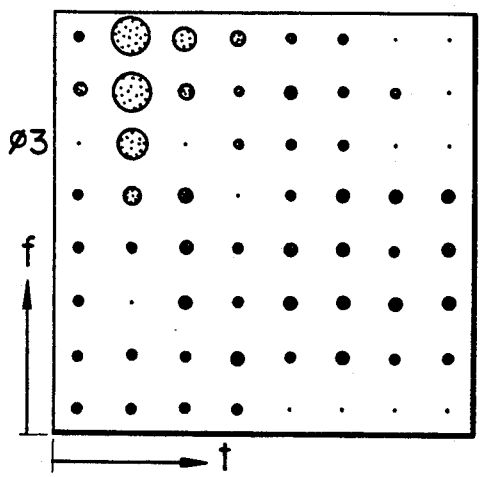
Figure 2D:
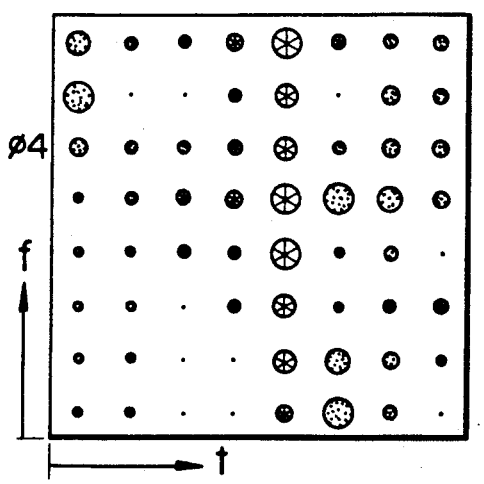

According to a pattern recognition system and method of the present invention, inner products of an input pattern and orthogonalized dictionary sets are nonlinearly converted by a positive-negative symmetrical nonlinear function, and the converted values are subjected to predetermined computation processing using predetermined coefficients in units of categories. As a result, a variation in input pattern can be effectively absorbed by simple computation processing, and the input pattern can be accurately recognized.

For example, eigenvectors of a speech pattern are obtained as shown in FIGS. 2A through 2D. Eigenvectors $\phi_1$, $\phi_2$, $\phi_3$, and $\phi_4$ of first through fourth axes shown in FIGS. 2A through 2D are those of orthogonalized dictionary patterns (eigenvectors) obtained up to a tenth axis from speech patterns of a monosyllable speech/cho/([tʃo]) pronounced by 300 speakers by the KL expansion. In FIGS. 2A through 2D, ● represents a positive vector value, and ⊕ represents a negative vector value.

The eigenvector $\phi_1$ of the first axis expresses a feature (vector) of an average input pattern. However, since a plosive portion of /cho/([tʃo]) is obscured, the input pattern cannot be recognized to be distinguished from /sho/([ʃo]). The eigenvector $\phi_2$ of the second axis mainly expresses a displacement in a frequency direction, and the eigenvector $\phi_3$ of the third axis mainly expresses a plosive portion of an affricate/cho/([tʃo]). Therefore, when the eigenvector of the third axis is referred, the input pattern can be recognized to be distinguished from /sho/([ʃo]) described above. Furthermore, the eigenvector $\phi_4$ of the fourth axis mainly expresses a displacement in a time direction.

In this example, eigenvectors of fifth and subsequent axes are not illustrated. However, information carried by each eigenvector is not so clear like the eigenvectors of the first through fourth axes.

In this manner, the eigenvectors $\phi_1$, $\phi_2$, $\phi_3$, and $\phi_4$ (orthogonalized patterns) constituting an orthogonalized dictionary obtained by the KL expansion well express a variation in a speech (or character, or figure) pattern. This resembles feature extraction in lower-order layers in a multi-layer neural network.

Therefore, based on this point of view, a process of computing an inner product of an input pattern and an orthogonal vector is considered as a first (lowermost) layer in the neural network in the present invention, and a neural network for receiving the outputs from the first layer is constituted to execute pattern matching processing. As a result, coefficient computations of inputs of a large number of dimensions at the lowermost layer can be omitted. More specifically, the first layer portion is separated from the BP algorithm, and only a higher-order layer portion is independently computed.

As a result, of the neural network, the number of layers for which coefficients are computed by the BP algorithm can be reduced to 1 or 2. Therefore, pattern matching processing with a considerably reduced computation volume can be realized.

Figure 3:
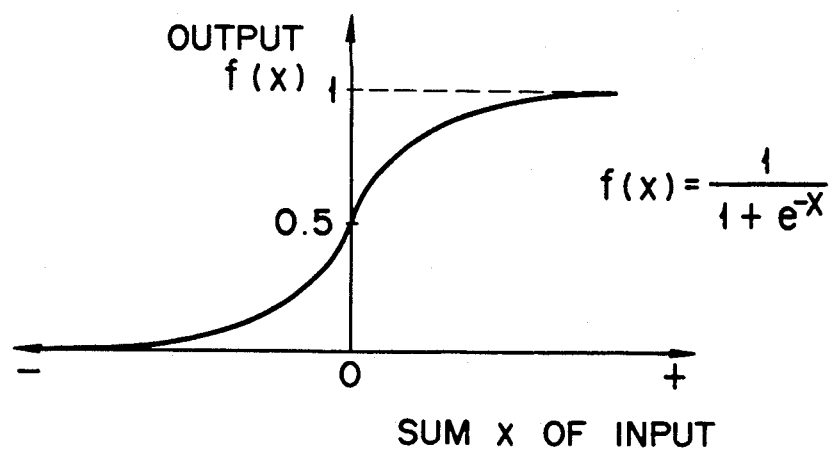
FIG. 3 is a chart showing a nonlinear function normally used in a neural network.

A process of combining outputs from a lower-order layer by a nonlinear conversion is provided between adjacent layers of the neural network. As a function of executing the nonlinear conversion, a sigmoid function expressed by the following formula (FIG. 3) is often used:

$$f(x) = 1/(1 + e^{-x})$$

where x is the total sum of inputs. The inner products of the input pattern and the orthogonal vectors (eigenvectors $\phi_1$, $\phi_2$, $\phi_3$, and $\phi_4$) take positive/negative values, and the magnitude of the absolute value of each inner product represents a degree of contribution to the corresponding axis. Therefore, there is a new problem that the nonlinear function such as the sigmoid function cannot be directly applied.

Figure 4:
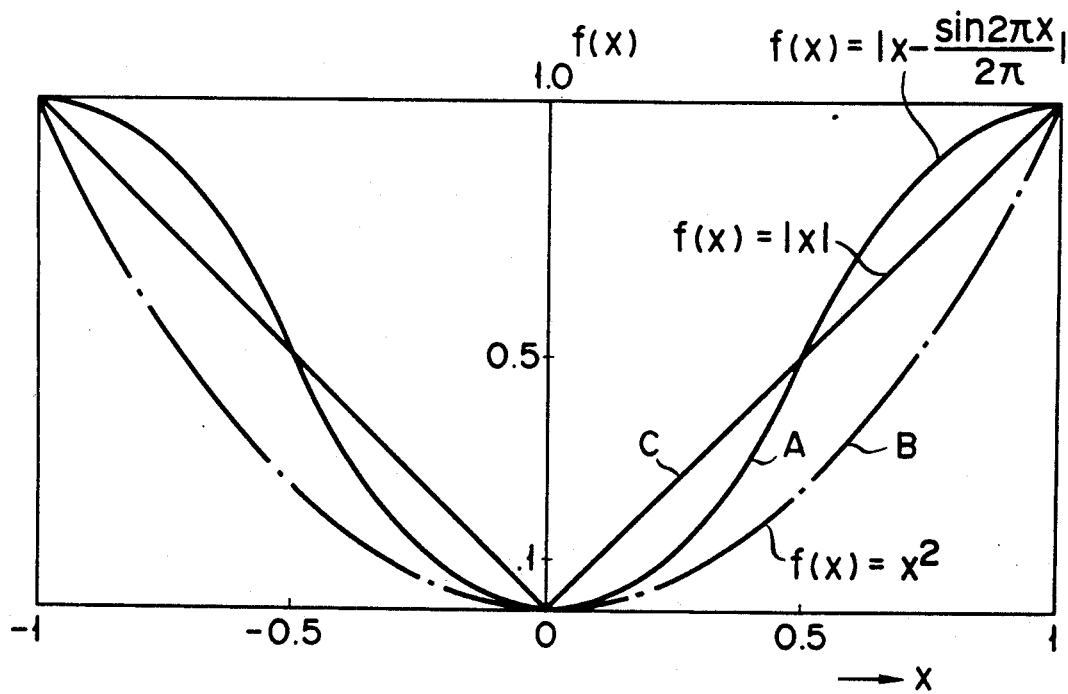
FIG. 4 is a chart showing a positive-negative symmetrical nonlinear function introduced in the present invention.

In the present invention, a positive-negative symmetrical nonlinear function shown in FIG. 4 is adopted to perform the nonlinear conversion of the inner products.

In FIG. 4, a function A is a positive-negative symmetrical function having characteristics similar to the sigmoid function within the range of $|x| \leq 1$, and is given by:

$$A: f(x) = x - \left| \frac{\sin 2\pi x}{2\pi} \right|$$

A function B shown in FIG. 4 is a quadratic function given by:

$$B: f(x) = x^2$$

Furthermore, a function C exhibits linear characteristics in positive and negative regions, and is given by:

$$C: f(x) = |x|$$

The inner products of the input pattern and the orthogonal vectors are nonlinearly converted using the positive-negative symmetrical nonlinear functions A, B, and C, thus obtaining a means for transferring the outputs to the higher-order layers of the neural network. Therefore, high-performance pattern recognition processing can be realized by a combination of the subspace method and the neural network, each of which compensates for the drawbacks of the other.

When the nonlinear conversion described above is performed in practice, the absolute values of inner products of an input pattern and orthogonal vectors are computed, and a positive-side nonlinear conversion shown in FIG. 4 may be performed for the absolute values.

After the inner products of an input pattern and the orthogonal axes are nonlinearly converted by the symmetrical nonlinear function, these values $G = (S1, S2, \ldots, SM)$ may be input to a statistical discriminant function in place of the neural network. In this case, for example, a Bayes decision rule given by the following equation is utilized to discriminate the input pattern.

$$L_{(K)} = \frac{\exp\{-(1/2) \cdot (G - \mu_K) T R_K^{-1} (G - \mu_K)\}}{(2\pi)^{M/2} \cdot |R_K|^{\frac{1}{2}}} \quad (2)$$

where $\mu_K$ and $R_K$ are respectively the mean vector and the covariance matrix of an input pattern G obtained from learning data. T indicates transposition, and $R_K^{-1}$ and $|R_K|$ are respectively the inverse matrix of the covariance matrix $R_K$ and the value of the determinant.

In the Bayes decision, values given by equation (2) are computed in units of categories, and a category providing a maximum value is discriminated as a recognition result. When a Maharanobis distance is used as a simplified method of the Bayes decision, pattern recognition processing may be performed according to the following equation:

$$M_{(K)} = (G - \mu_K)^T R_K^{-1} (G - \mu_K) \ldots (3)$$

When the statistical discriminant function is used in place of the neural network, the same effect can be obtained.

Figure 5:
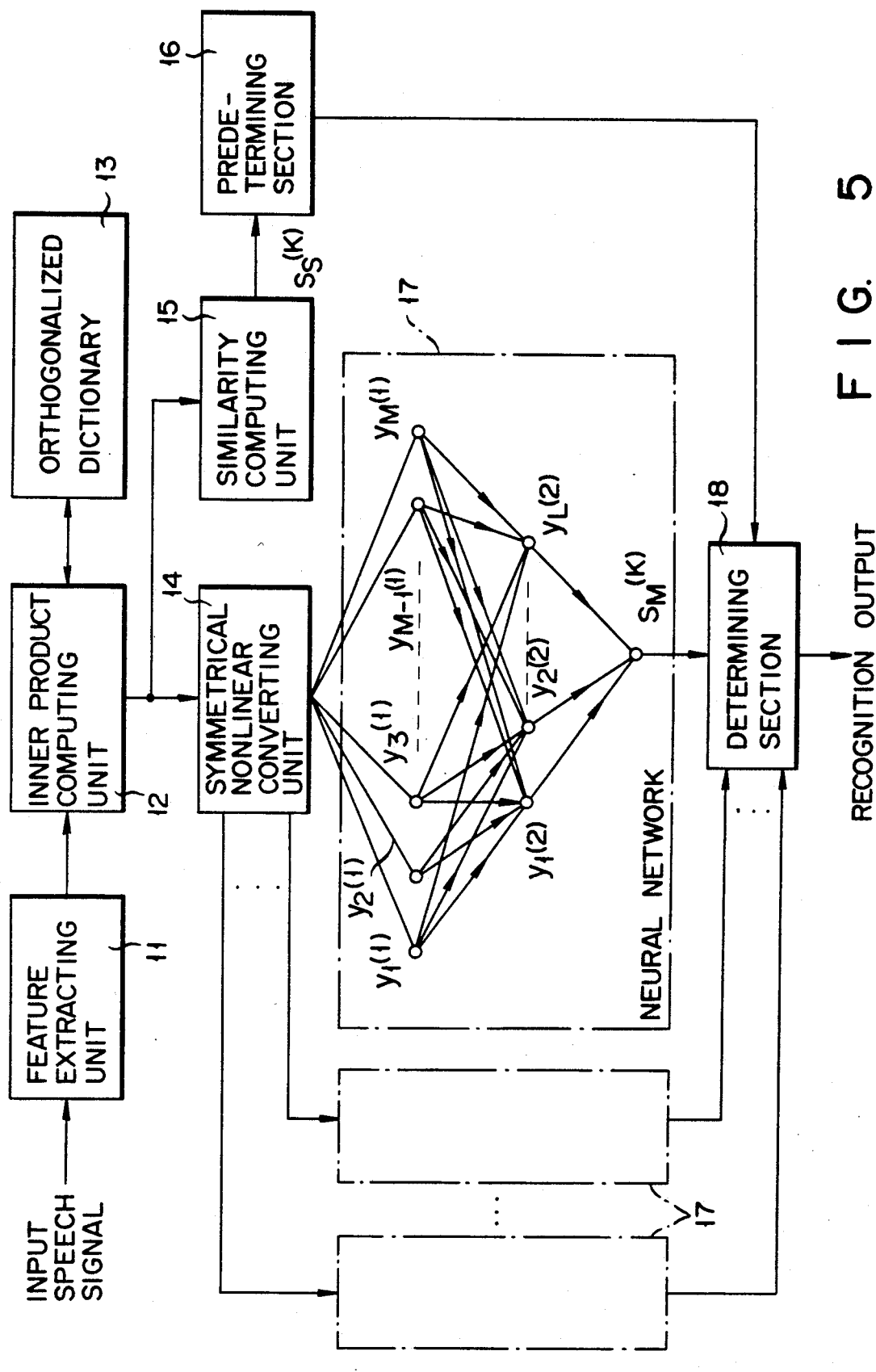
FIG. 5 is a block diagram showing the first embodiment of a pattern recognition system according to the present invention.

FIG. 5 is a block diagram when pattern recognition of the present invention is applied to speech recognition.

Input speech is input to a feature extracting unit 11. The feature extracting unit 11 samples the input speech at 12 kHz to analog-to-digital convert the input speech into 12-bit digital data, and computes its power and LPC analysis parameters. This computation processing is performed under conditions that a window length is 24 msec, a frame period is 8 msec, an order of LPC analysis is 16, and the number of terms of the LPC mel-cepstrum is 16. Thereafter, the feature extracting unit 11 detects an input speech interval, and extracts power and LPC analysis parameter in this interval as a speech feature (input pattern). The unit 11 then supplies the extracted feature to an inner product computing unit 12.

The inner product computing unit 12 executes inner product computations of the input pattern obtained as described above and orthogonalized dictionary sets which are prepared in units of categories to be recognized and are stored in an orthogonalized dictionary memory 13. The inner products between the input pattern and the orthogonalized dictionary sets are supplied to a symmetrical nonlinear converting unit 14 and a similarity computing unit 15 based on the partial space method.

The symmetrical nonlinear converting unit 14 nonlinearly converts the inner products in accordance with the positive-negative symmetrical nonlinear function shown in FIG. 4, and supplies the converted values to a neural network unit 17. The similarity computing unit 15 executes similarity computation processing by the subspace method given by equation (1) for the inner products. The similarity computation result obtained by the similarity computing unit 15 is supplied to a predetermining section 16. The predetermining section 16 determines whether the value from the similarity computing unit 15 is to be output as a recognition result or is to be discriminated by the neural network unit 17.

The neural network is provided with coefficients shown in FIG. 5 in the same manner as in the orthogonalized dictionary sets. These coefficients are computed in advance in units of categories to be recognized on the basis of learning data using the above-mentioned BP algorithm. More specifically, after the learning pattern is nonlinearly converted as described above, the weight coefficients are computed based on the Back Propagation (BP) algorithm in such a way that $G = (S_1, S_2, \ldots S_n)$ is used as the input pattern of a fully connected multi-layer neural network which outputs 0.9 and 0.1 if the learning pattern is true and false, respectively. In this embodiment, the neural network is a multi-layer neural network each layer having a plurality of elements and each element including a multiplier for multiplying an input signal from a lower adjacent layer by a preset weight coefficient and connected to all the elements constituting the upper adjacent layer.

The neural network unit 17 is provided in units of categories, as shown in FIG. 5, and receives the nonlinearly converted values $G (= (S1, S2, \ldots, SM); M$ is the number of orthogonal axes) to compute sums of products with the coefficients along connecting lines shown in FIG. 5. The unit 17 combines the sums in units of nodes, and executes the nonlinear conversion based on the sigmoid function to obtain signals y1, y2, ..., yL. Similarly, the unit 17 computes sums of products between these signals and the coefficients, and executes nonlinear conversion. The unit 17 then combines the converted values to obtain an output associated with a given category. Of neural network outputs for all the categories obtained in this manner, a category which provides a maximum output is discriminated as a recognition result, thereby recognizing the input pattern.

FIG. 6 shows a neural network of the speech recognition system shown in FIG. 5. The same reference numerals in the neural network in FIG. 6 denote the same parts as in FIG. 5.

Input patterns output from the feature extracting unit 11 are subjected to an inner product computation $(F \cdot \phi_{(K,m)})$ given by equation (1) and are added by the inner product computing unit 12. The sum output values from the inner product computing unit 12 as the inner products are nonlinearly converted by the symmetrical nonlinear converting unit 14. The neural network unit 17 further computes inner products of weighting coefficients and the output values $y_1^{(1)}$, $y_2^{(1)}$, ..., $y_M^{(1)}$ from the symmetrical nonlinear converting unit 14 in units of categories, computes a total sum of the inner products, and then nonlinearly converts the total sum according to the sigmoid function, thus obtaining $S_M^{(K)}$.

The similarity computing unit 15 computes a total sum of values obtained by multiplying the output values $y_1^{(1)}$, $y_2^{(1)}$, ... $y_M^{(1)}$ from the symmetrical nonlinear converting unit 14 with "1" and values obtained by multiplying the output values $y_1^{(1)}$, $y_2^{(1)}$, ..., $y_M^{(1)}$ with "2", thus obtaining an output $S_S^{(K)}$.

$S_S^{(K)}$ corresponds to a score of the subspace method alone. $S_M^{(K)}$ can be regarded as a score of the neural network alone when projective components to each subspace are input to the neural network. A determining section 18 performs primary determination based on higher-order scores ($S_{S1}$, $S_{S2}$, ...) of $S_S^{(K)}$. As a result, when a plurality of candidates are obtained, the recognition result is determined based on $S_M^{(K)}$.

In this embodiment, neural network computations for all the categories are performed for an input. However, in a practical application, certain recognition candidates may be selected by utilizing the output from the predetermining section 16, and only higher-order candidates may be subjected to computations by the neural network unit 17. The number of layers of the neural network may be changed within the spirit and scope of the invention.

In this manner, in the pattern recognition system and method of the present invention, inner products between an input pattern and the orthogonalized dictionary sets are computed and are nonlinearly converted, and the converted values are supplied to the neural network unit 17 to execute pattern recognition processing. According to the system and method of the present invention, accurate recognition processing can be realized by the inner product computations and nonlinear conversion without performing complicated coefficient computations in earlier stages in the neural network. As a result, an input pattern can be easily and effectively recognized with high accuracy using the neural network in which coefficient computations are simplified, while drawbacks of the subspace method in terms of various noise components are effectively eliminated.

FIG. 7 is a block diagram showing the second embodiment of a pattern recognition system according to the present invention. Note that the same reference numerals in FIG. 7 denote the same parts as in FIG. 5, and a detailed description thereof will be omitted. In this embodiment, pattern recognition processing is executed using the statistical discriminant function described above in place of the neural network. In this embodiment, input speech is analyzed by a feature extracting unit 11 as in the first embodiment to obtain its power and LPC analysis parameter, and a speech interval is detected to extract a speech feature (input pattern). An inner product computing section 12 computes inner products between the input pattern and orthogonalized dictionaries prepared in units of categories and stored in an orthogonalized dictionary memory 13. The inner products are nonlinearly converted by a symmetrical nonlinear converting unit 14. Thereafter, a statistical discriminant function computing unit 19 performs predetermined coefficient computations using the nonlinearly converted values.

The statistical discriminant function computing unit 19 executes coefficient computation processing by referring to a coefficient registering unit 20 which stores mean vectors and covariance matrices obtained from learning data in units of categories in the same manner as the orthogonalized dictionary sets.

More specifically, the statistical discriminant function computing unit 19 receives the nonlinearly converted values G (=(S1, S2, ..., SM); M is the number of orthogonal axes), and executes coefficient computation processing in accordance with equation (2) or (3) between the inputs and coefficients given from the coefficient registering unit 20, thus obtaining evaluation values. Of the evaluation values (outputs) computed in this manner, a category which provides a maximum output of all the categories (in the Bayes decision, a minimum value for the Maharanobis distance) is discriminated as a recognition result for the input pattern, thus recognizing the input pattern.

In this case, certain candidates may be selected by utilizing an output from a predetermining section like in the first embodiment without computing the statistical discriminant function for all the categories, and higher-order candidates may be subjected to discriminant function computations.

The present invention is not limited to the above embodiments.

For example, the number of axis of orthogonalized dictionaries used in inner product computations, the number of categories to be recognized, and the number of layers constituting the neural network may be determined in accordance with specifications of pattern recognition. The nonlinear function for nonlinearly converting inner products is not limited to the one described above.

What is claimed is:

1. A speech pattern recognition system comprising:
    speech input means for inputting a speech pattern to be recognized;
    feature extracting means for extracting feature vectors from the input speech pattern;
    dictionary mean for storing a plurality of orthogonalized reference patterns, which are equal to eigenvectors calculated using Karhunen-Loeve (KL) expansion, and whose categories are known;
    inner product computing means, provided for each category, for computing inner products of the input speech pattern, using said feature vectors, whose category is unknown and the orthogonalized reference patterns of a category which are stored in said dictionary means and whose category is known;
    converting means, provided for each category, for nonlinearly converting the inner product of a category, which is computed by said inner product computing means, in accordance with a positive-negative symmetrical nonlinear function;
    evaluation value computing means, provided for each category and each evaluation value computing means including a multi-layer neural network whose elements each include multiplier means for multiplying an input signal from a lower adjacent layer by a preset weight coefficient and being connected to all elements constituting an upper adjacent layer, for computing an evaluation value of a category using the nonlinearly converted values calculated by said converting means and weight coefficients which are preset in said neural network of a category based on a discriminatively trained Back Propagation (BP) algorithm;

comparing means for comparing the evaluation values obtained by said evaluation value computing means using said neural networks with other evaluation values; and discriminating means for outputting a category to which the input speech pattern belongs as a recognition result using comparison results of said comparing means.

2. A computer-implemented speech pattern recognition method comprising the steps of:

inputting a speech pattern to be recognized;

extracting feature vectors from the input speech;

computing inner products of the input pattern, using said feature vectors, whose category is unknown and orthogonalized reference patterns of a category which are equal to eigenvectors calculated using Karhunen-Loeve (KL) expansion, and whose category is known;

nonlinearly converting the inner product of a category, which is computed in the computing step, in accordance with a positive-negative symmetrical nonlinear function;

computing an evaluation value from the nonlinearly converted values converted by the converting step and weight coefficients using a multiple neural network whose elements each include multiplier means for multiplying an input signal from a lower adjacent layer by a preset weight coefficients and connected to all elements constituting an upper adjacent layer in which said weight coefficients are preset for each category based on a discriminatively trained Back Propagation (BP) algorithm;

comparing in the evaluation values obtained from said neural networks in the evaluation value computing step of said categories with other evaluation values; and discriminating and outputting a category to which the input pattern belongs as a recognition result from comparison results of the comparing step.

3. A speech pattern recognition system, comprising:

speech input means for inputting a speech to be recognized;

feature extracting means for extracting feature vectors from the input speech;

multi-layer neural networks whose elements each include multiplier means for multiplying an input signal from a lower adjacent layer by a preset weight coefficient and connected to all elements constituting an upper adjacent layer and, respectively provided for categories of speech, for receiving the feature vectors as input, and for outputting evaluation values for each category, each of said neural networks having, as weight coefficients of a hidden layer, the weight coefficients being computed based on a discriminatively trained Back Propagation (BP) algorithm, eigenvectors calculated in advance by Karhunen-Loeve (KL) expansion from known feature vectors belonging to one of said categories, a nonlinear function of an output of the hidden layer being a positive-negative symmetrical nonlinear function; and determining means for determining a category as a recognition result from evaluation values output from the multi-layer neural networks.

4. A speech pattern recognition system as recited in claim 1, wherein said multi-layer neural network comprises:

second inner product computing means for computing second inner products using said nonlinearly converted inner products of a category from said converting means and said preset weight coefficients;

second converting means for nonlinearly converting said second inner products computed by said second inner product computing means;

means for obtaining a sum of the nonlinearly converted second inner products from said second converting means; and third converting means for nonlinearly converting the sum of the nonlinearly converted second inner products, thereby producing said evaluation value.

* * * * *